G. C. WORTMAN.
DUMPING PUSH CAR.
APPLICATION FILED DEC. 18, 1916.

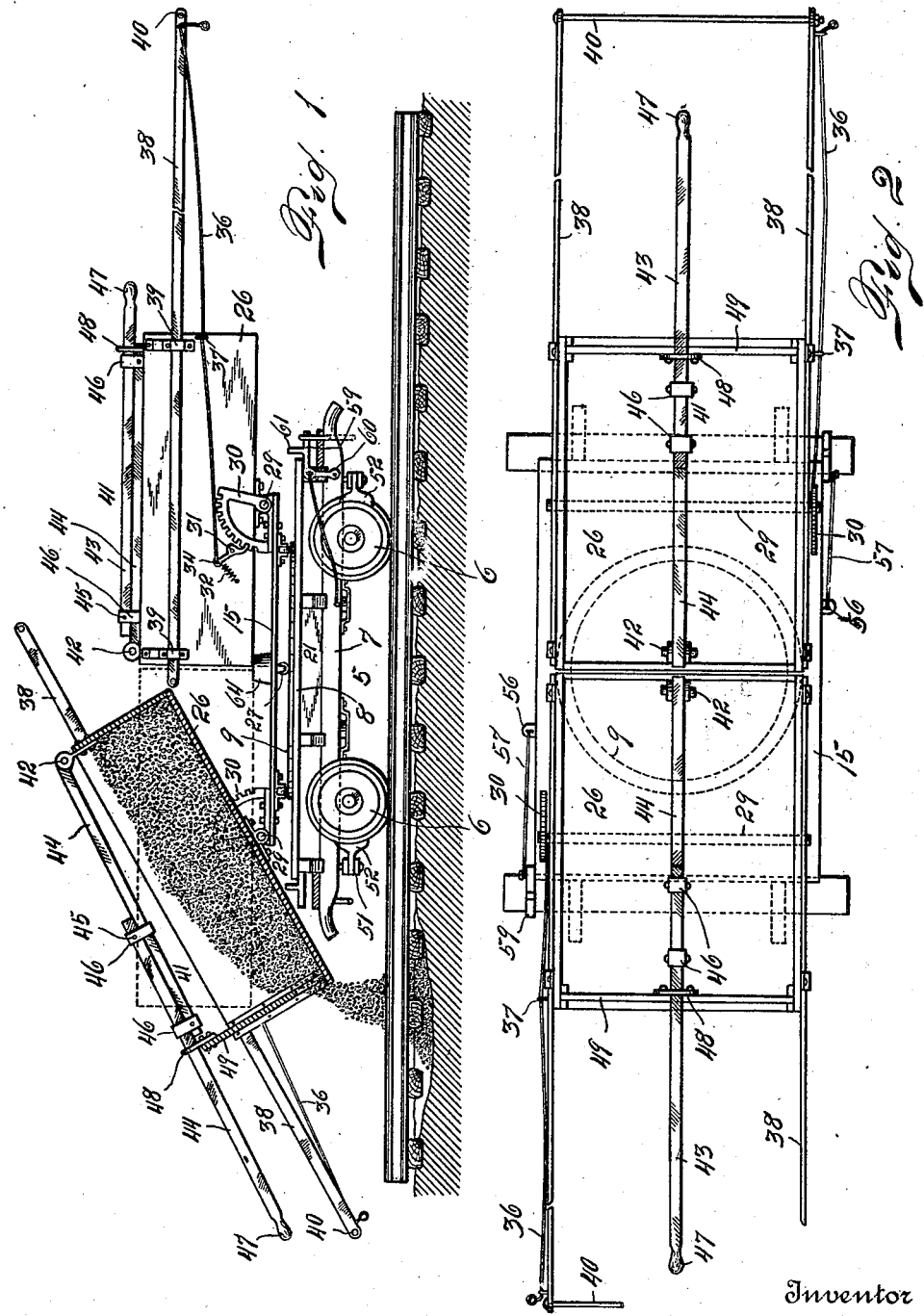

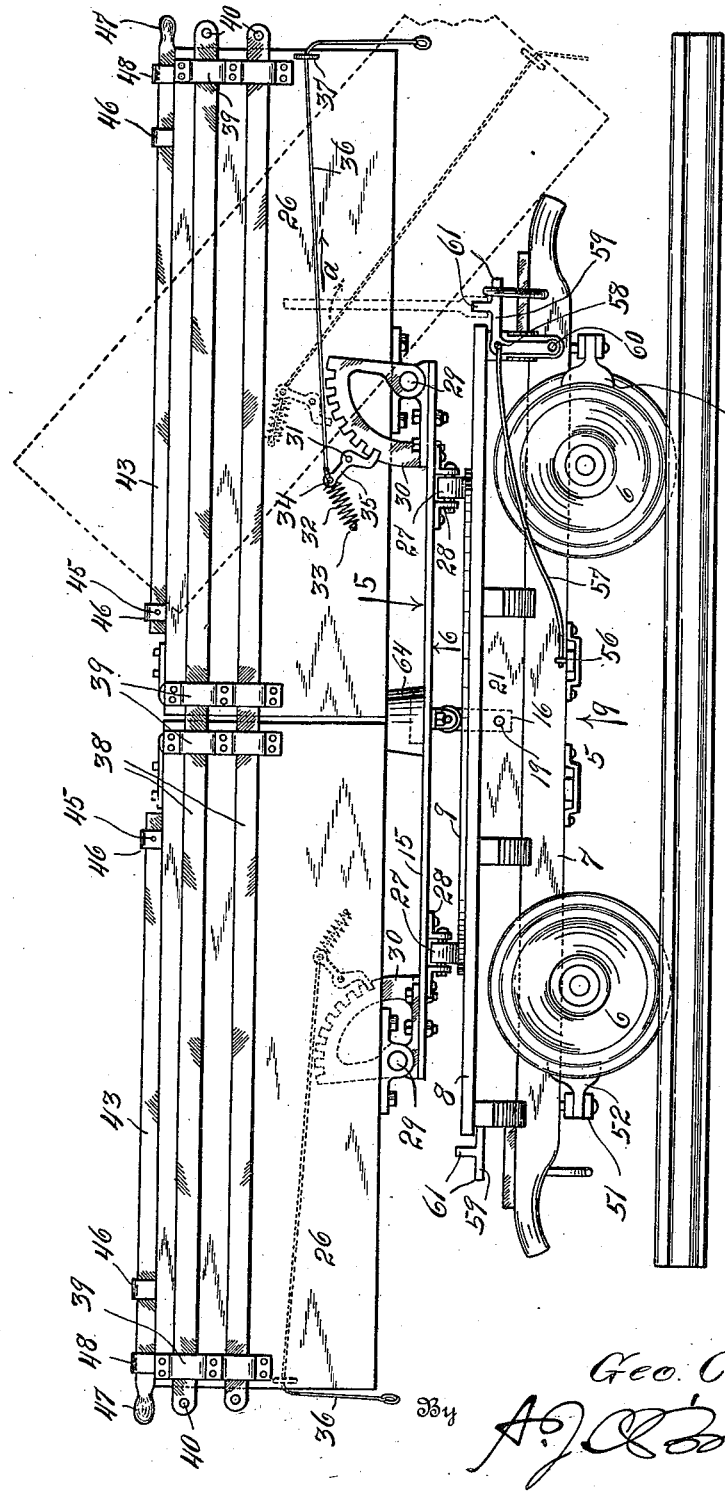

1,274,833.

Patented Aug. 6, 1918.
6 SHEETS—SHEET 3.

Inventor
Geo C. Wortman.
By
Attorney

G. C. WORTMAN.
DUMPING PUSH CAR.
APPLICATION FILED DEC. 18, 1916.

1,274,833

Patented Aug. 6, 1918.
6 SHEETS—SHEET 4.

Inventor
Geo. C. Wortman.
By
Attorney

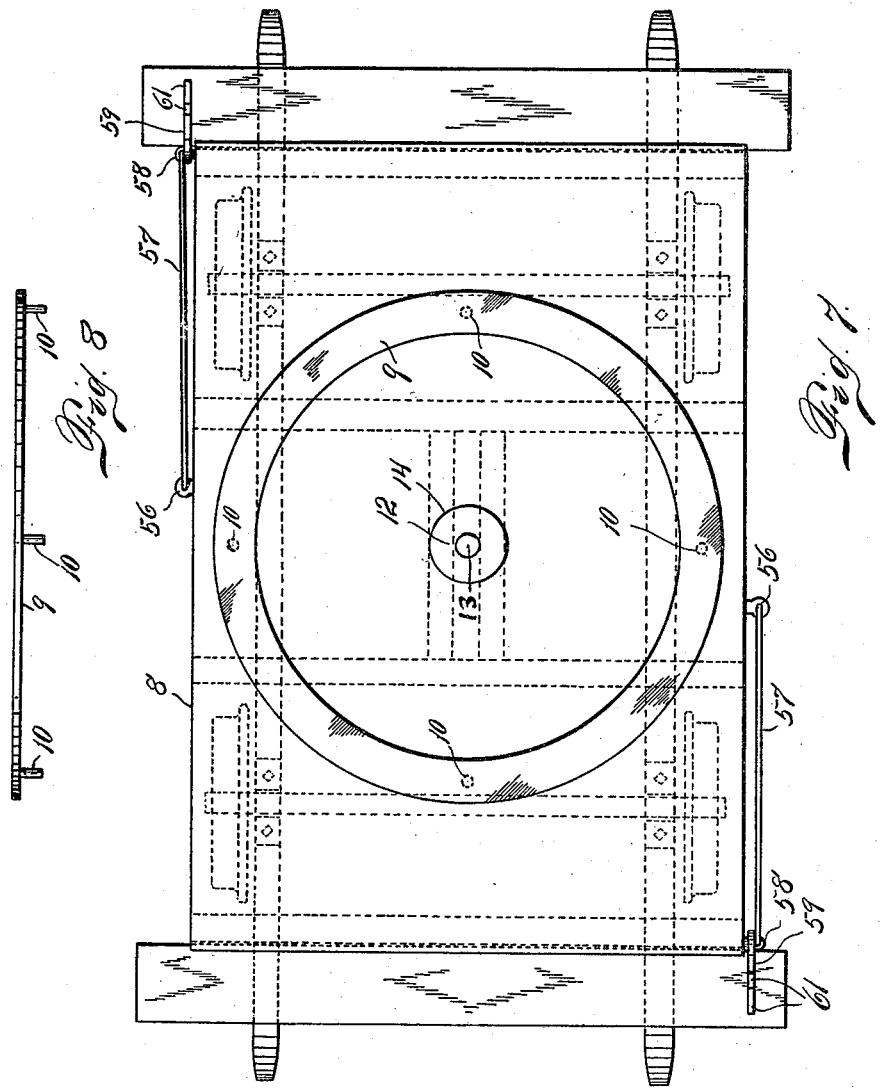

G. C. WORTMAN.
DUMPING PUSH CAR.
APPLICATION FILED DEC. 18, 1916.
1,274,833.
Patented Aug. 6, 1918.
6 SHEETS—SHEET 6.
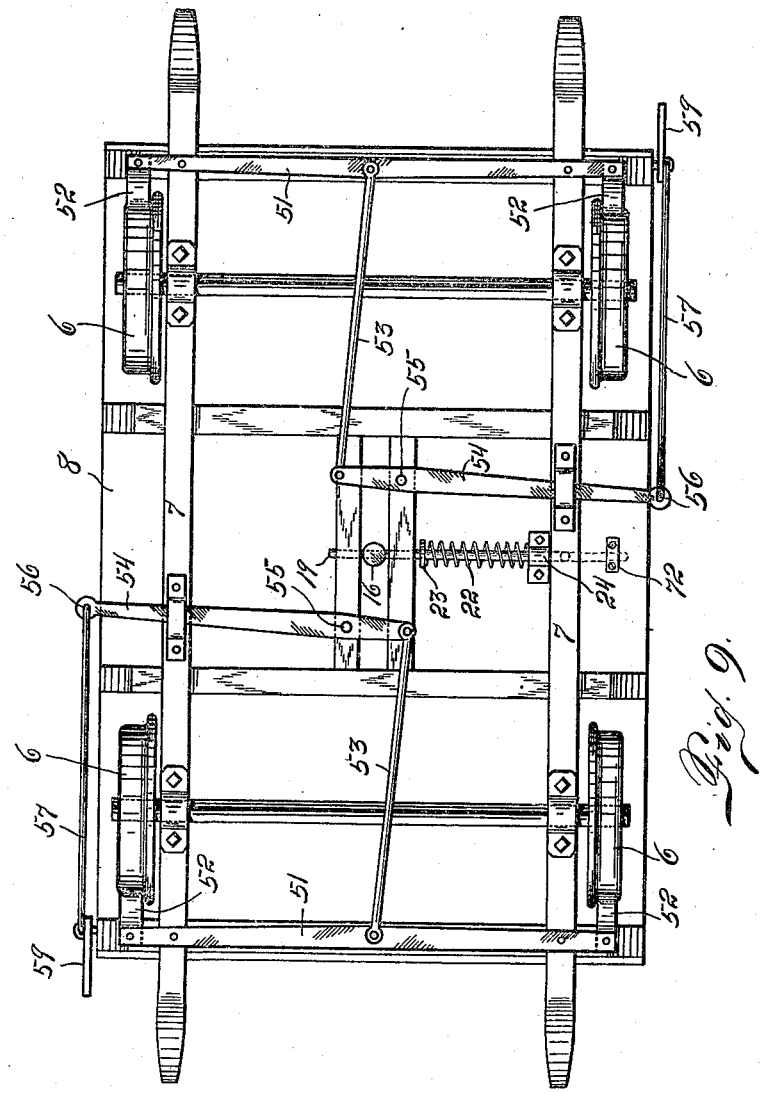
Fig. 9.
Inventor
Geo. C. Wortman.
By 
Attorney

UNITED STATES PATENT OFFICE.

GEORGE C. WORTMAN, OF DENVER, COLORADO.

DUMPING PUSH-CAR.

1,274,833. Specification of Letters Patent. Patented Aug. 6, 1918.

Application filed December 18, 1916. Serial No. 137,476.

*To all whom it may concern:*

Be it known that I, GEORGE C. WORTMAN, citizen of the United States, residing at the city and county of Denver and State of Colorado, have invented certain new and useful Improvements in Dumping Push-Cars; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in push cars of such construction that the car body or bodies are hingedly connected with a rotary platform and equipped to facilitate the dumping of the contents of the car bodies. Preferably each car is equipped with a pair of body members the individuals of which are independently tiltable for dumping purposes.

In my present improvement provision is made whereby the car body members may be readily detached from the truck member of the structure when for any reason it may be necessary or desirable to do so as, for instance, when a train is approaching and the push car must be removed from the track in order to let the train pass. In this event the platform with which the body members are pivotally connected may be lifted from the truck together with the body members. The structure is equipped with slidable bars which, when in their normal position, lock the two body members together and maintain them in the upright position and in endwise relation. When it becomes necessary or desirable to dump the cars, these bars are moved endwise far enough to disengage them from one of the body members after which the other member may be tilted to the dumping position by disengaging a spring-held dog from a quadrant arranged adjacent the body member to be dumped. Furthermore each body member is equipped with a longitudinally extensible handle bar structure which is operably connected with an end gate of the car whereby the end gate may be opened and closed at will. By means of this structure the end gate may be gradually opened whereby the escape of the contents may be regulated at will, such escape being cut off as soon as desired.

Having briefly outlined my improvement I will proceed to describe the same in detail, reference being made to the accompanying drawing in which is illustrated an embodiment thereof.

In this drawing:

Figure 1 is a side elevation partly in section of my improved dumping push car construction, one of the body members being shown tilted in the dumping position.

Fig. 2 is a top plan view of the same.

Fig. 3 is a side elevation, the dumping position of one of the body members being indicated by dotted lines.

Fig. 7 is a top plan view of the push car truck equipped with a central bushing and a circular track which anti-frictional rollers carried by the body member of the car engage when the structure is in use.

Fig. 8 is a detail view of the track ring.

Fig. 9 is an underneath view of the truck illustrating the brake mechanism employed, being a view looking in the direction of arrow 9, Fig. 3.

Fig. 10 is a detail view of a lever which may be employed in applying the brakes.

The same reference characters indicate the same parts in all the views.

Figure 4:
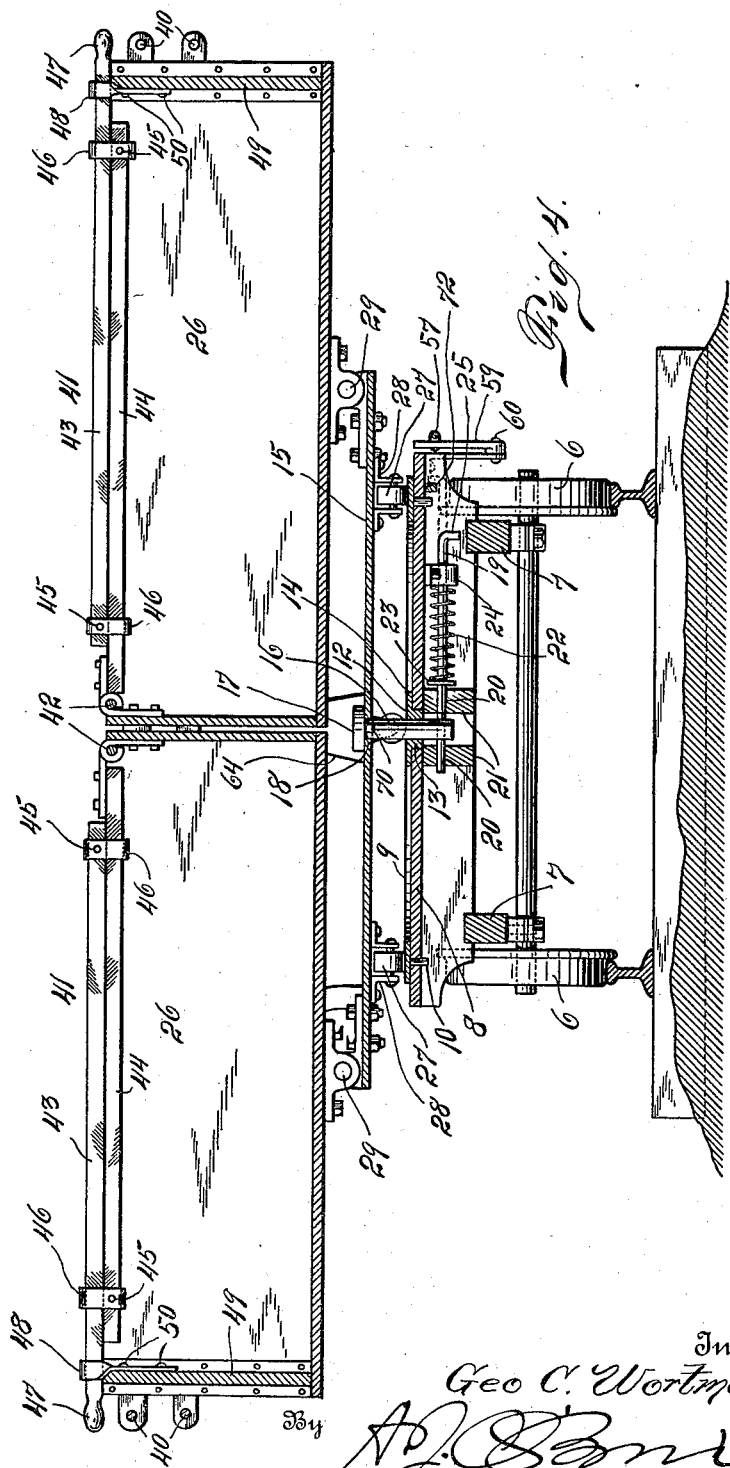
Fig. 4 is a longitudinal section taken through the body members and a cross section taken through the track structure, the body members being arranged at right angles to the direction of travel of the car when on the track.
Figure 5:
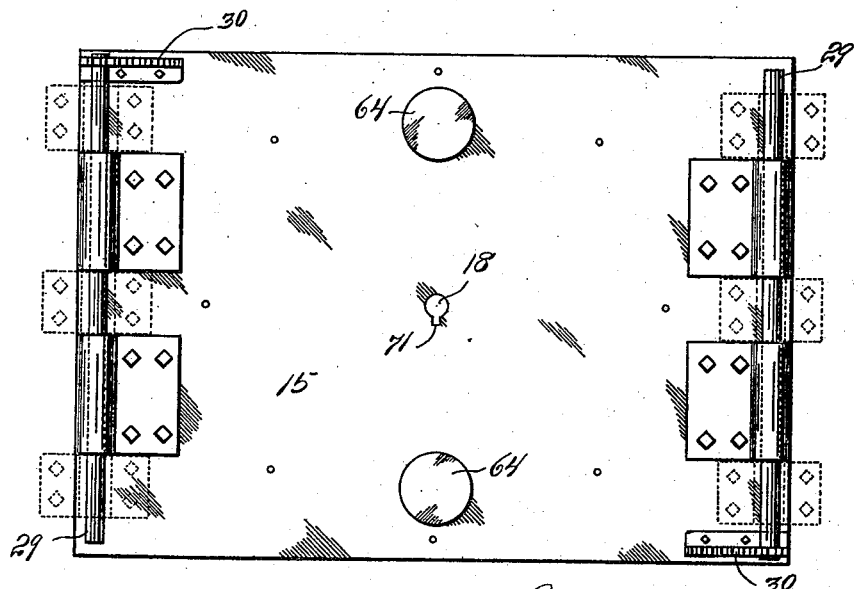
Fig. 5 is a top plan view of the platform with the body members removed, being a view looking in the direction of arrow 5, Fig. 3.
Figure 6:
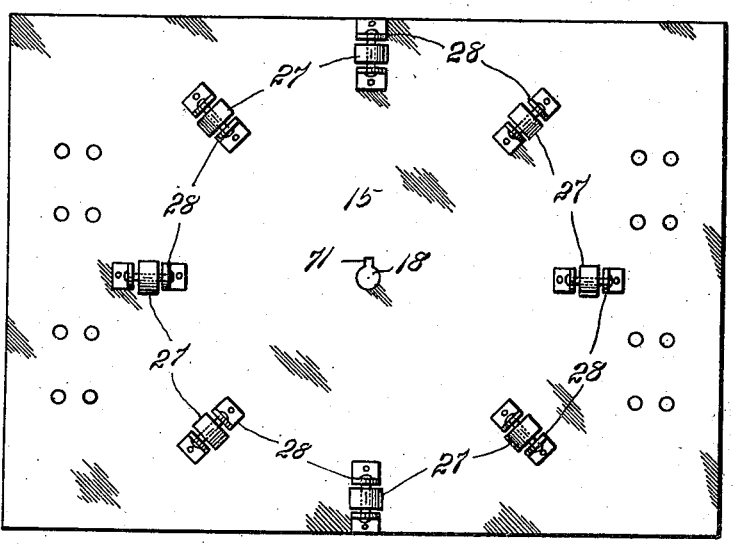
Fig. 6 is an underneath view of this platform or a view looking in the direction of arrow 6, Fig. 3.

Let the numeral 5 designate the push car truck composed of wheels 6, a frame 7 and a main platform 8. This structure, so far as the elements mentioned are concerned, is of ordinary build.

My improvement commences with the track ring 9 which is equipped with depending studs or pins 10 adapted to enter recesses of counterpart shape formed in the platform 8 of the truck. By virtue of this construction the ring 9 may be readily applied and as readily removed from the truck. Furthermore, the central portion of the truck as illustrated in the drawing is equipped with a bushing 12 which enters a central opening 13 formed in the truck platform. This bushing extends slightly above the surface of the platform and is expanded somewhat as shown at 14, this expanded portion as shown in the drawing being of the same thickness as the track ring 9.

Above the track ring 9 the structure is equipped with a rotary platform 15 which is connected with the main platform 8 by means of a king bolt 16 which passes through an opening formed in the bushing 12, its head 17 engaging the upper surface of the rotary platform 15 around a central opening 18 formed in the rotary platform. The lower portion of the king bolt below the platform 8, is provided with a transversely arranged opening adapted to receive a locking pin 19 which is spring held in locking engagement with the king bolt and also enters registering openings 20 formed in blocks 21 arranged between the platform 8 and the framework 7 of the truck. This locking pin is equipped with a spiral spring 22 normally under tension to maintain the pin in locking engagement with the king bolt. The spring 22 is located between a stop 23 mounted on the pin and a perforated lug 24 mounted on the platform 8 and through which the pin 19 passes. The outer extremity 25 of the pin 19 is shaped to facilitate hand manipulation. As shown in the drawing this extremity of the pin 19 is bent approximately at right angles to its body portion, thus making it practicable for the user of the push car to reach underneath the platform 8 from one side of the car and move the pin sufficiently against the tension of spring 22 to disengage it from the king bolt 17, when it becomes necessary to remove the body members 26 of the structure from the truck.

This rotary platform 15 is equipped with small wheels 27 which are journaled in angle brackets 28 secured to the lower surface of the said platform. These wheels engage the circular track 9 and facilitate the rotation of the platform 15 on the truck whereby the body members of the car may be arranged to dump their contents in any desired direction as circumstances may require.

As shown in the drawing, and as heretofore intimated, the car is equipped with two body members 26 which consist simply of boxes, preferably of rectangular shape and hingedly connected with the rotary platform 15 as shown at 29. As illustrated in the drawing, the two body members are arranged end to end and in such relation that either may be dumped independently of the other. It will be understood that the body structure of the car together with the rotary platform 15 may be turned upon the king bolt 16 whenever it may be desired to do so.

In order to maintain each body member 26 in the upright position as shown at the right of Fig. 1, in full lines in Fig. 3 and also in Fig. 4, the rotary platform 15 is equipped adjacent the body member with a notched quadrant 30 adapted to be engaged by a locking dog 31 which is normally spring-held in engagement with a recess of the quadrant. The spring 32 which acts on the dog, is secured to the car body at one extremity as shown at 33 but its opposite extremity is connected as shown at 34 with the arm 35 of the dog. Also connected with the arm 35 of the dog is a cable or other suitable connection 36 which passes through a guide 37 near the outer end of the body member and extends downwardly in position to be readily grasped by the user of the car for the purpose of disengaging the dog from its coöperating quadrant when it is desired to dump the corresponding body member of the car. It will be understood that as force is applied to the cable 36 in the direction of the arrow $a$ (see Fig. 3) the arm 35 of the dog will be moved in the direction of the pull on the cable and the spring 32 stretched sufficiently to disengage the dog from the quadrant after which the car may be tilted as hereinafter explained.

The body members of the car are equipped on each side with a pair of bars 38 which slidably engage guide loops 39 mounted on the side walls of the two body members 26. As shown in the drawing, these bars 38 are arranged one above another on the opposite sides of the car. The upper pair of bars 38 one on each side are connected at their opposite extremities, which are perforated for the purpose, by rods 40 which are readily removable. As shown in the drawing (see Fig. 2) each of these rods has a head on one end and a nut on the other whereby when the nut is unscrewed the rod may be readily removed. It will be understood that in order to dump either car body member, both sets of bars 38 must be pulled sufficiently to unlock the two body members from each other. In order to pull either pair of bars toward the right, for instance, the rod 40 which connects the left hand extremities of the said bars must be removed. In practice one pair of bars will be moved in one direction and the other pair of bars in the opposite direction when it is desired to dump one or both body members. In this way the projecting portions of each pair of bars constitute manipulating handles whereby the car bodies may be tilted for dumping purposes and raised to their normal position as may be desired. As shown in the drawing, the body members are approximately centrally hinged, their outer extremities being preferably slightly farther from the axis of the hinge than their inner extremities whereby when the bars 38 are properly manipulated and any dog 31 unlocked, the body member will automatically assume the tilted or dumping position. It should be explained, however, that the exact location of the hinge pin with reference to the opposite extremities of the cars is not vital since it may be so located that slight downward pressure of the protruding extremities of the pair of bars 38 may be necessary in order to over-balance the car body for dumping purposes. The protruding extremities or bars 38 however, are essential in restoring the car body to its normal or upright position after the dumping or partial dumping of said member.

Furthermore, each body member 26 is equipped with a centrally located extensible handle bar 41 hingedly connected with the inner extremity of the car at the top as shown at 42, each of these handle bars being composed of two parts 43 and 44 to each of which is attached, as shown at 45, a metal loop or guide 46 through which the other member passes. Normally, or when the cars are in their upright position and until the discharge of the contents, either in whole or in part, of the body member is required, each handle bar is adjusted as best shown in Fig. 4 whereby only the short handle end 47 of one member of the bar extends beyond the outer extremity of the body member. The upper member 43 of each handle bar engages a loop 48 which extends above the upper edge of the car body and forms a connection with the handle bar for the purpose of manipulating the end gate 49 of the body member when it is desired to allow the contents of the car, either all or in part, to escape. Before opening the end gate, the corresponding handle bar will be extended or drawn outwardly preferably to its limit of movement. The partial extension of one of these handle bars is indicated in Figs. 1 and 2. When this is done the operator will have the advantage of relatively powerful leverage in opening the end gate 49 or slidable end member of the car body to which the loop 48 is secured as shown at 50.

From the foregoing description the use and operation of my improved dumping push car will be readily understood. The normal position of the parts of the entire car structure is illustrated in full lines in Fig. 3. This is the normal position of the car during loading. It is evident, however, that if it is more convenient to load the car, as in many instances it will be, the body members may be shifted to the position shown in Fig. 4 whereby they extend at right angles to the direction of travel of a car on a track or at any other angle thereto as convenience may dictate. In any event, as soon as the car is loaded it may be moved along the track for purposes of repair by the discharge of its contents as may be required. It is evident that the whole or any portion of the contents of either body member may be deposited in a single place as may be required. If only a small part of the contents is to be discharged in a single place, it is evident that the end gate 49 will be only partially opened as shown in Fig. 1. However, if it is desired to dump the entire contents of the body member in a single place the end gate may be raised to its full height or completely opened whereby the contents will quickly escape down the incline formed by the tilted body member.

As shown in the drawing, the car structure is equipped with suitable brake mechanism composed of brake beams 51 carrying shoes 52, each beam being connected by means of a rod 53 with a lever 54 fulcrumed at 55 and whose outer extremity is connected as shown at 56 with a rod or cable 57 one extremity of which is connected as shown at 58 with a lever 59 fulcrumed on the truck as shown at 60. This lever, as shown in the drawing, is composed of two arms arranged at right angles to each other, one of these arms being provided with projections 61 adapted to enter the socket extremity 62 of a manipulating bar 63. When it is desired to apply the brakes to either set of wheels, the bar 63 is applied to the lever 59 in the manner indicated by dotted lines in Fig. 3. The lever is then moved in the direction indicated by the dotted arrow, whereby sufficient force is supplied to the lever 54 to force the brake shoes against the wheels of the truck for braking purposes.

Attention is called to the fact that the rotary platform 15 of the structure is equipped with a number of upwardly projecting short pedestals 64 which are of sufficient height to engage the bottoms of the car bodies when the latter are in the horizontal position (See Fig. 3); the height of these pedestals corresponds to the height of the hinging structure of the body members of the car.

The king bolt 16 is preferably provided with a lug 70 adapted to engage a counterpart recess 71 formed in the platform member 15, whereby the said pin is prevented from rotating in the platform. The lug 70 and the recess 71 are so disposed that when the pin is in place in the said platform member the opening in the lower extremity of the pin for the rod 19, is in register with the openings 20 in the blocks or beams 21.

The platform 8 of the truck is equipped with a depending stop member 72 which may engage the bent extremity 25 of the rod 19, when the rod is adjusted to distinguish it from the pin 16. The position of the rod 19 when thus adjusted and in engagement with the stop 22, is shown by dotted lines in Fig. 4.

Having described my invention, what I claim is:

1. A push car including a framework, a pair of body members each of which is hingedly connected with the framework and independently tiltable, and adjustable means for locking the two body members together to prevent either member from assuming the dumping position, said means comprising bars slidably connected with the walls of the body members.

2. A push car comprising a framework, two body members hingedly connected therewith to permit either to assume the dumping position independently of the other, adjustable means for locking each body member in any desired position of tilting adjustment, a handle bar hingedly connected with each body member, a slidable end gate for each body member, and an operable connection between said end gate and said handle bar.

3. A push car comprising a framework, two body members hingedly connected therewith to permit either to assume the dumping position independently of the other, adjustable means for locking each body member in any desired position of tilting adjustment, an extensible handle bar hingedly connected with each body member, a slidable end gate for each member, and an operative connection between said end gate and the handle bar of the member.

4. A push car comprising a framework, two body members hingedly connected therewith to permit either to assume the dumping position independently of the other, adjustable means for locking each body member in the desired position of tilting adjustment, a handle bar hingedly connected with each body member at the inner extremity of the latter, an end gate for each body member, said gate being at the opposite end of the member from that with which the handle bar is hingedly connected, and an operative connection between said end gate and the handle bar substantially as described.

5. A car comprising a framework, two body members hingedly connected therewith to permit either to assume the dumping position independently of the other, means for regulating the tilting of each body member for dumping purposes, a handle bar hingedly connected with each body member and composed of two slidably connected parts, an end gate for each body member, an operable connection between said end gate and the handle bar of the corresponding member.

6. A push car comprising a framework, a body member hingedly connected therewith to permit it to assume the tilting position for dumping purposes, means for locking the body member in any desired degree of tilting adjustment, a handle bar hingedly connected with the body member, an end gate with which the body member is equipped, and an operable connection between the handle bar and said end gate.

7. A push car comprising a framework, a body member hingedly connected therewith to permit it to assume a tilting position for dumping purposes, means for regulating the degree of tilting movement of the body member, an extensible handle bar movably connected at one extremity with the body member, an end gate with which the body member is also equipped, and an operable connection between the end gate and the said handle bar.

8. A push car comprising a framework, a body member hingedly connected therewith for dumping purposes, a handle bar hingedly connected with the inner extremity of the body member, an end gate at the opposite extremity of the body member, and an operable connection between the end gate and the said handle bar.

9. A push car comprising a framework, a body member hingedly connected therewith for dumping purposes, a handle bar movably connected with the body member at one extremity, an end gate with which the body member is equipped, and a slidable connection between the end gate and the said handle bar to permit the opening and closing of the end gate through the medium of said handle bar.

10. A push car comprising a framework, a body member tiltably mounted thereon, a handle bar hingedly connected at one end with the body member which is provided with an end gate, and an operable connection between the end gate and the handle bar.

11. A push car including a body member tiltably connected therewith, a handle bar hingedly connected to one end of the body member, an end gate at the opposite end of the body member, the end gate being provided with a loop through which the handle bar slides freely for operating purposes.

12. A push car comprising a framework, two body members hingedly connected therewith and independently, tiltable bars slidably connected with the opposite sides of both body members, and rods detachably connected with the opposite ends of the said bars.

13. A push car comprising a framework, two body members hingedly connected therewith and independently tiltable, two pairs of bars slidably connected with the opposite side walls of the said body members and whose extremities normally extend beyond the outer ends of both body members, and rods detachably applied to the protruding extremities of the said bars.

14. A car including a framework, a platform, a pin for rotatably connecting the platform with the framework to permit removal in the direction of the axis of rotation, and a spring actuated rod engaging the pin to lock the platform against removal.

15. A push car comprising a frame member, a body member tiltably mounted on the frame member, a notched sector on one of said members, and a pivoted dog on the other member for engaging the sector to maintain the body member in desired position.

In testimony whereof I affix my signature, in presence of two witnesses.

GEORGE C. WORTMAN.

Witnesses:
HELEN A. VILLEMAGNE,
A. EBERT O'BRIEN.

Copies of this patent may be obtained for five cents each, by addressing the "Commissioner of Patents, Washington, D. C."